Patented Nov. 12, 1935

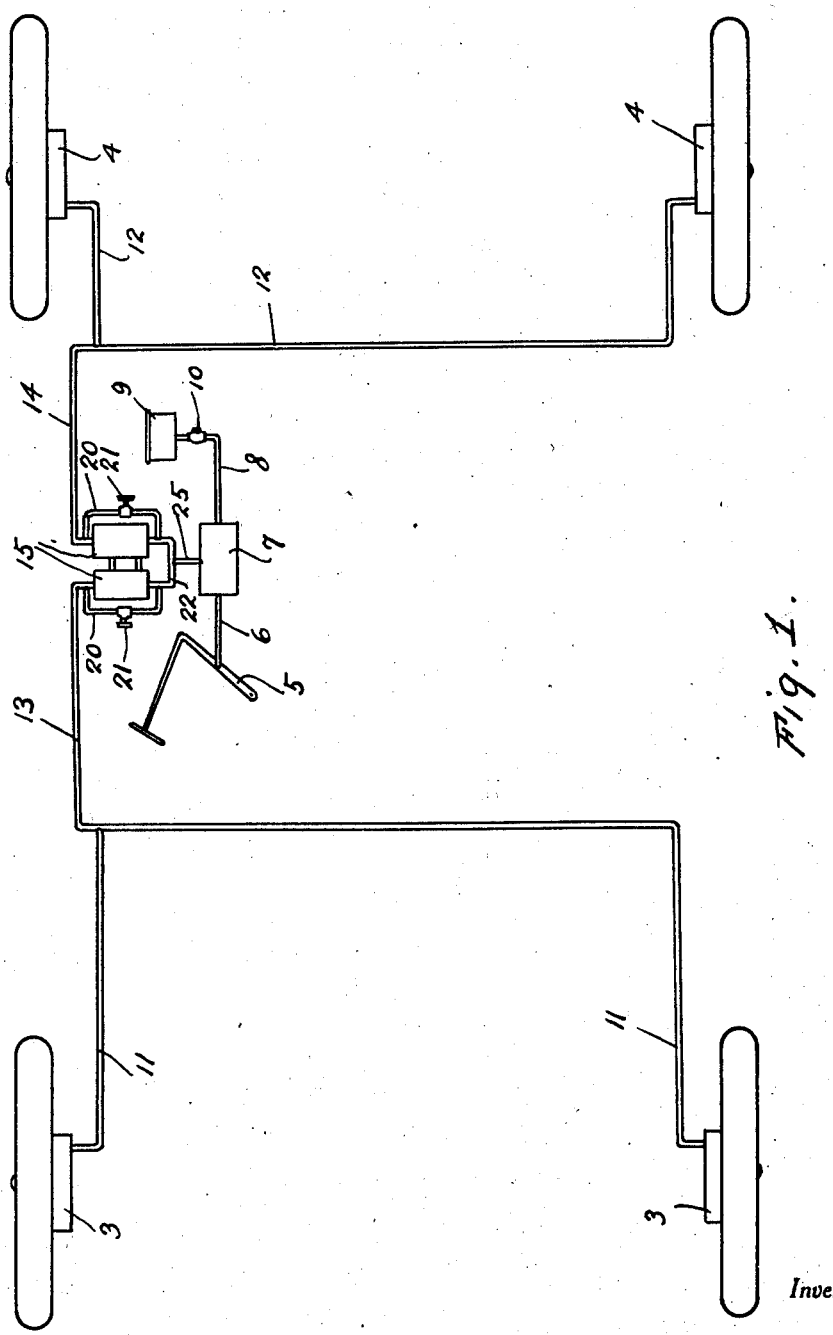

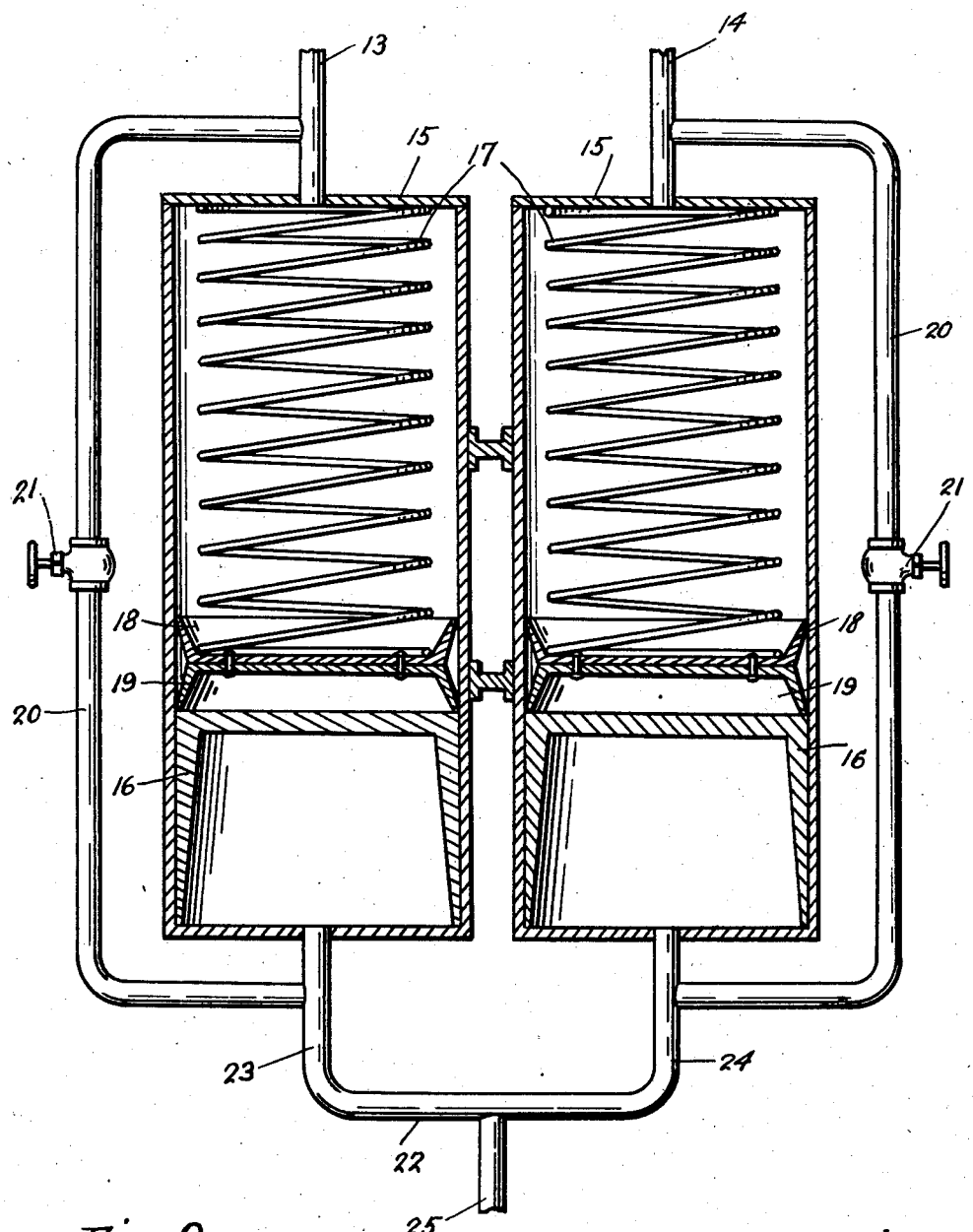

2,020,770

UNITED STATES PATENT OFFICE 2,020,770

HYDRAULIC BRAKE SYSTEM

John Dodd Deblieux and John Alonzo Dunbar, Opelousas, La.

Application July 3, 1933, Serial No. 678,934

1 Claim. (Cl. 303—84)

This invention relates to certain structural refinements and improvements embodied in a conventional type of hydraulic brake system.

The ordinary hydraulic brake assembly embodies a manually depressed foot pedal operatively associated with a master cylinder which master cylinder is connected with the four wheel brake cylinders through the instrumentality of fluid distributing pipe lines. The master cylinder is in turn connected with a fluid supply reservoir or tank.

Under the present day arrangement, if leakage occurs in the master cylinder, the supply tank or the pipe lines, the brake fluid escapes rendering the braking power inoperative.

The present invention has to do with installation in the piping system of two or more safety cylinders in communication at one end with the master cylinder and communicating at their opposite ends with branch pipes leading respectively to the front and rear sets of wheels. The purpose of this arrangement is to provide reserve means so that in the event that the part of the system controlling the front wheels is thrown out of operation by leakage or accident, the rear part of the system will still operate, and vice versa, whereby to promote safety and avoid needless accidents.

The particular structural details selected for accomplishing this result will become more readily apparent from the following description and drawings.

In the drawings:

Figure 1 is a diagrammatic view illustrating the complete system and the relative position of the safety devices therein.

Figure 2 is an enlarged sectional and elevational view showing the details of the safety duplex unit or device.

Attention is first invited to Figure 1, wherein the two rear brakes are generally denoted by the numerals 3 and the front brake by the numerals 4. These brakes are distinguished in sets or pairs in keeping with the principle of the inventive conception as will be clarified later. As is usual, the braking system involves the employment of a manually actuated foot pedal 5 which is operatively connected as at 6 with the master cylinder 7. The master cylinder is in turn connected by way of piping 8 to a reservoir 9 usually provided with a check valve 10.

The distributing pipes or feed lines of the rear brakes are differentiated by the numerals 11 and those for the front brakes by the numeral 12. In the present invention, instead of connecting the lead pipes or lines 13 and 14 directly with the master cylinder 7, the connection is made through the medium of the safety device which constitutes the novelty of the present invention. This safety device is shown in detail in Figure 2.

Referring to Figure 2, it will be observed that the device is of a duplex or twin type. Each unit of the device is however the same in construction, and a description of one will suffice for both. Proceeding with this thought in mind, the numeral 15 designates a cylinder and 16 an internal cup-shaped piston. The numeral 17 represents an expansion coiled return spring co-operating at one end with a packing cup 18 which in turn is attached to a complemental or companion cup 19. These cups 18 and 19 are located within the vicinity of and in contact with the cylinder 16.

The numeral 20 designates a by-pass pipe having a bleeding valve 21. The two cylinders are appropriately joined together in assembled relationship and are supplied by a U-pipe 22 whose branches 23 and 24 are connected with the adjacent ends of the cylinders. The numeral 25 merely designates the main feed pipe from the master cylinder to the U-pipe 22. It is of course evident that the ends of the by-pass pipe 20 are connected with the intake and discharge pipes 23 and 13 respectively.

The operation of the arrangement shown in the drawings is as follows:

When the driver of the car steps on the brake pedal 5 equal pressure is relayed from the master cylinder 7 to each of the safety cylinder pistons 15, compressing the return springs 17 and sending the pressure to the wheel cylinders (not shown) of the car, and thereby applying the brakes. When the driver releases the pedal pressure, the wheel cylinder pistons send the fluid back to the return spring end of the safety cylinders and with the help of the same return springs the piston and piston cups are forced to their original position, and the fluid in the piston end of the safety cylinder is returned to the master cylinder.

Bleeding

Open the bleeder by-pass valve 21 on one of the cylinders and bleed the brakes on one wheel connected to that cylinder by pumping the pedal all the way up and down, until the.e are no more air bubbles to be seen in the fluid coming from the bleeder tube at the wheel. Then hold the pedal down and cut off the bleeder valve at the wheel. Then pump the pedal up and down until there is a good pressure and cut off the by-pass valve while pumping. Repeat this operation on all four wheels.

Advantages of the hydraulic safety device

The hydraulic brake safety device is made to prevent accidents caused by the blowing out or leaking of a line or wheel cylinder on the hydraulic braking systems.

All of us that understand hydraulic brakes know that should a leak occur anywhere in the system all four of the wheel brakes are useless. We also know that most of the leaks and breaks occur in the lines or in the wheel cylinders.

With the hydraulic brake safety device attached directly to the master cylinder this danger is eliminated. Should a line or a piston cup anywhere in the system blow out or form a leak in one of the front wheels or line leading to same the safety device will hold up the pressure in the rest of the system; leaving the rear brakes in perfect working order. Should the trouble occur in the rear wheels the action would be the same and the front wheels would work perfectly.

Thus the safety device eliminates the danger of driving along; stepping on the brake pedal; may be a smashup or if not, certainly a good scare and frantic pumping on the pedal with a loss of brake fluid and no results.

A fault in the front brakes will not affect the rear brakes and a fault in the rear brakes will not affect the front brakes. Should any trouble occur the driver can immediately notice the fact that he has only two wheel brakes and have the trouble corrected. Without the safety device he has no warning and runs the risk of killing someone or wrecking his car.

A careful consideration of the foregoing description in conjunction with the illustrative drawings will enable the reader to obtain a clear understanding of the purpose, features, and advantages, the explicit construction, and the invention as hereinafter claimed.

It is to be understood that minor changes in shape, size, relative proportions and materials may be resorted to in practice without departing from the spirit of the invention or the scope of the invention as now claimed.

We claim:

A device for use in association with a master cylinder and brake fluid delivery lines for the front and rear brakes, respectively, of a vehicle, comprising a pair of exterior cylinders located in the braking system between the master cylinder and fluid lines, means for connecting the cylinders together in parallel relation, a U-shaped pipe having its limbs connected to corresponding ends of said cylinders, means for connecting the bight of said U-shaped pipe with the master cylinder, outlet pipes connected with the opposite ends of said parallel cylinders and with the fluid lines, a pair of substantially U-shaped by-pass pipes located exteriorly of the parallel cylinders and each having one end connected to a limb of the U-shaped pipe and its other end to an outlet pipe, a valve in each by-pass pipe, a spring in each cylinder having one end contacting the inner face of the outlet end of the cylinder and piston means in the other end of each cylinder for actuation by the fluid entering the cylinder from the master cylinder, said piston means being engaged by the spring.

JOHN DODD DEBLIEUX.
JOHN ALONZO DUNBAR.